(12) United States Patent
Macatangay et al.

(10) Patent No.: US 11,294,704 B2
(45) Date of Patent: *Apr. 5, 2022

(54) MONITORING AND REPORTING PERFORMANCE OF ONLINE SERVICES USING A MONITORING SERVICE NATIVE TO THE ONLINE SERVICE

(71) Applicant: Microsoft Technology Licensing, LLC, Redmond, WA (US)

(72) Inventors: Darell D. Macatangay, Redmond, WA (US); Patrick R. Kabore, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 362 days.

This patent is subject to a terminal disclaimer.

(21) Appl. No.: 16/504,460

(22) Filed: Jul. 8, 2019

(65) Prior Publication Data

US 2019/0332416 A1 Oct. 31, 2019

Related U.S. Application Data

(63) Continuation of application No. 14/739,095, filed on Jun. 15, 2015, now Pat. No. 10,379,889.

(51) Int. Cl.
*G06F 9/455* (2018.01)

(52) U.S. Cl.
CPC .......... *G06F 9/45558* (2013.01); *G06F 9/455* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS 7,886,294 B2 * 2/2011 Dostert ............... G06F 11/3055
718/1

* cited by examiner

*Primary Examiner* — Michael W Ayers

(57) ABSTRACT

Implementations of enhanced service monitoring technology are disclosed herein. In one example implementation, an online service is hosted in a data center environment. The data center environment includes computing facilities and an application executed on the computing facilities to provide at least a portion of the online service. The application includes a monitoring service that monitors the computing facilities and other resources running in the data center environment that provide at least another portion of the online service.

20 Claims, 9 Drawing Sheets

MONITORING AND REPORTING PERFORMANCE OF ONLINE SERVICES USING A MONITORING SERVICE NATIVE TO THE ONLINE SERVICE

RELATED APPLICATIONS

This application is a continuation of, and claims priority to, U.S. patent application Ser. No. 14/739,095, entitled "MONITORING AND REPORTING PERFORMANCE OF COLLABORATION SERVICES USING A MONITORING SERVICE NATIVE TO THE COLLABORATION SERVICE," and filed Jun. 15, 2015, which is hereby incorporated by reference in its entirety.

TECHNICAL BACKGROUND

Many examples abound of online services that are delivered to end users from high capacity data center environments. Examples include social networks, gaming services, email, productivity suites, financial and accounting platforms, and music and video services. End users access the services on their personal computing devices through local applications that interface with applications running in the data center environments. Many other types of services will migrate to what is colloquially known as the cloud, if they have not already.

Such services are typically provided by service applications and other resources that run on computing facilities in the data center environments. The computing facilities include physical and virtual servers that execute the applications, examples of which include web servers, service applications, and databases. For instance, a collaboration service may be provided by a web server that serves user requests, a collaboration application that provides the main application engine for the service, and databases that support the engine.

Monitoring solutions are deployed in many data center environments to ensure the high availability and reliability of an online service. A given monitoring solution may run alongside a service resource to monitor the performance of the resource, the physical or virtual computing element that hosts the resource, or other aspects of the facilities upon which the service relies. The solution may perform automated load-balancing or recovery functions, alarm on certain events, and report performance information in general.

Unfortunately, such monitoring solutions place their own load on the computing facilities that support a service. In the case of an example collaboration service, a monitoring service running alongside the service's application is, from the perspective of the machine supporting the application, another application that receives cycles on the machine. The monitoring itself can present a load that reduces the performance of the application.

OVERVIEW

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

Technology is disclosed herein that enhances service monitoring in data center environments. In an implementation, an online service is hosted in a data center environment. The data center environment includes computing facilities and an application executed on the computing facilities to provide at least a portion of the online service. The application includes a monitoring service that monitors the computing facilities and other resources running in the data center environment that provide at least another portion of the online service.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Enhanced service monitoring technology is disclosed herein that runs natively with respect to the application(s) that provide an online service in a data center environment. Rather than relying upon an external technology in the data center to monitor aspects of the service, a service application includes code that performs health checks and other monitoring tasks while running natively in the same context as the service being monitored.

Figure 1:
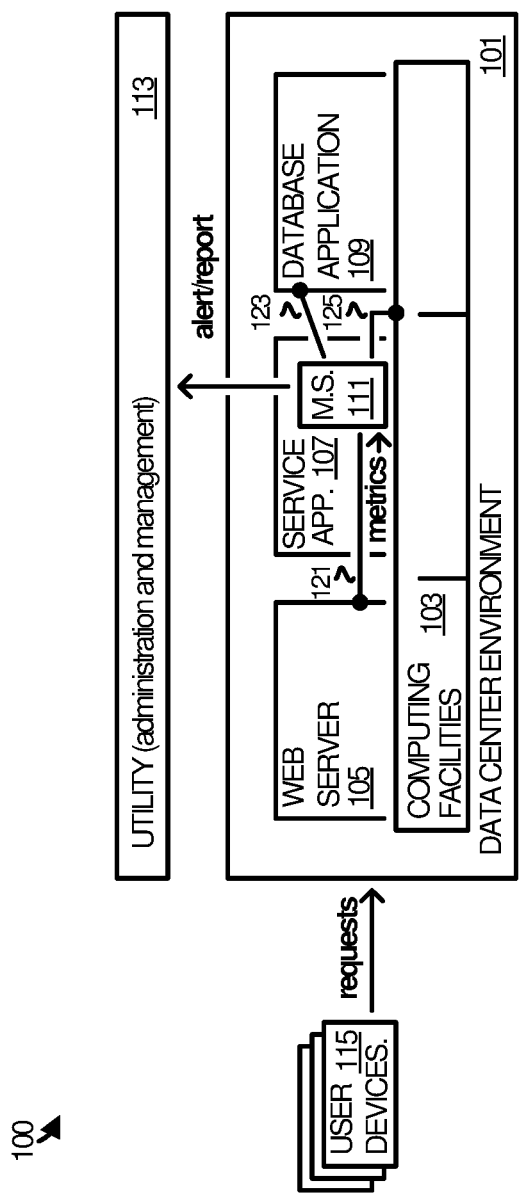
FIG. 1 illustrates an operational scenario in an implementation of enhanced service monitoring.

FIG. 1 illustrates an operational scenario 100 in an example implementation of enhanced service monitoring. Operational scenario 100 relates to an online service that is hosted in a data center environment 101. Examples of the online service include, but are not limited to, email services, productivity services, collaboration services, gaming services, communication services (instant messaging, voice and video communications), media services (music, videos, television, and the like), e-commerce services, and cloud storage services, as well as any other type of online service.

Data center environment 101 includes computing facilities 103, on which various applications and other resources are hosted in order to provide the service. Web server 105, service application 107, and database application 109 are representative of such applications and resources. End users engage with the online service via user devices 115, examples of which include mobile phones, laptop computers, tablets, desktop computers, wearable devices, and other suitable computing devices.

Service application 107 includes a monitoring service 111 that is a fully integrated component of the application. Monitoring service 111 may be communicatively coupled the computing facilities 103 in data center environment 101, as well as the other applications and resources that provide the online service.

Monitoring service 111 may also be communicatively coupled with utility 113 for alerting and reporting purposes. Utility 113 may be implemented external to data center environment 101, although in some cases utility 113 may be considered a part of data center environment 101.

Data center environment 101 is representative of any physical or virtual data center capable of hosting an online service. Data center environment 101 may be an on-premises implementation, a cloud implementation, a hybrid implementation, or any combination thereof. A third-party may operate data center environment 101 in some cases, while in others the same party may operate data center environment 101 that operates the online service. Multiple services may be hosted in data center environment 101 in some cases, while in others data center environment 101 may be dedicated to a single service.

Computing facilities 103 is representative of any physical computing element, virtual computing element, or variations, combinations, and collections thereof suitable for providing a computing fabric for hosted applications. Examples include computer servers, virtual machines, and containers, as well as routers, switches, load balancers, and other communication gear.

Web server 105 is representative of any server capable of providing a web-based front-end to the online service. Service application 107 is representative of an application that provides the core functionality of a service. Database application 109 is representative of a back-end database that is utilized by service application 107 to provide the service. Other applications and resources, in addition to or in-place of those disclosed herein, may also be included in the online service.

In operation, user device 115 communicate service requests to the online service. The requests may be, for example, hyper-text transfer protocol (HTTP) get requests, requesting information, images, or other content from the online service in the context of a service session. Web server 105 handles the requests, which includes communicating with service application 107 in some instances. Service application 107 may communicate with database application 109 to retrieve or store information related a given service session.

Monitoring service 111 runs in the context of service application 107 to monitor the performance of the other applications and resources that provide the online service, and also to monitor the performance of computing facilities 103. In particular, monitoring service 111 employs a monitoring process, an example of which is monitoring process 200 illustrated in FIG. 2.

Monitoring process 200 includes steps representative of certain functionality provided by monitoring service 111. Monitoring service 111 may be implemented with program instructions in the form of an application component, module, or collection thereof, included in a collection of components or modules used to implement service application 107.

Figure 2:
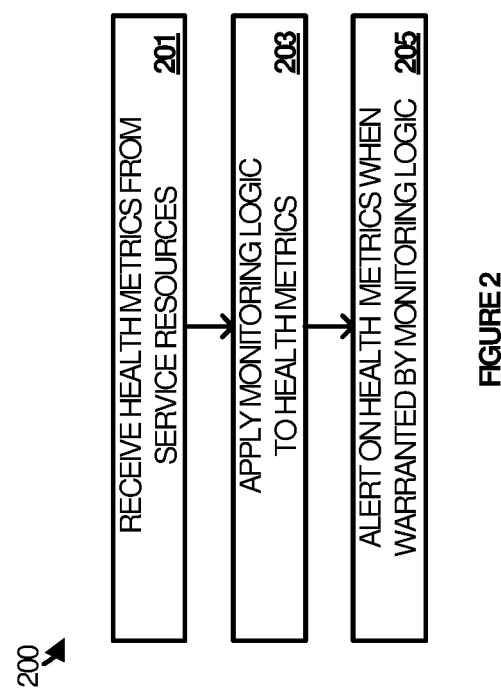
FIG. 2 illustrates a monitoring process in an implementation.

Referring parenthetically to the steps illustrated in FIG. 2, monitoring service 111 receives health metrics from services resources used to deliver the online service (step 201). For example, web server 105 provides metrics to monitoring service 111, as do database application 109 and computing facilities 103. Monitoring service 111 applies logic to the health metrics to determine whether or not to alert utility 113 (step 203). Utility 113 may be alerted when, for example, the metrics indicate that any one or more of the resources has failed or is about to fail.

Upon determining that an alert is appropriate, monitoring service 111 communicates an alert to utility 113 (step 205). Utility 113 may take action automatically in response to such alerts, such as to remove a resource from service and to replace it with a new resource. Other actions including adding new resources to the online service to add capacity. Many other actions may be taken by utility 113 and may be considered within the scope of the present disclosure.

In addition to (or in place of) alerting utility 113, monitoring service 111 may alert other components of the online service, so that those components can take action. For instance, in the case of a utilization surge, a given application or resource may be able to spawn a replica of itself. Similarly, computing facilities 103 may be capable of adding capacity to the service, without the intervention or involvement of utility 113.

Figure 3:
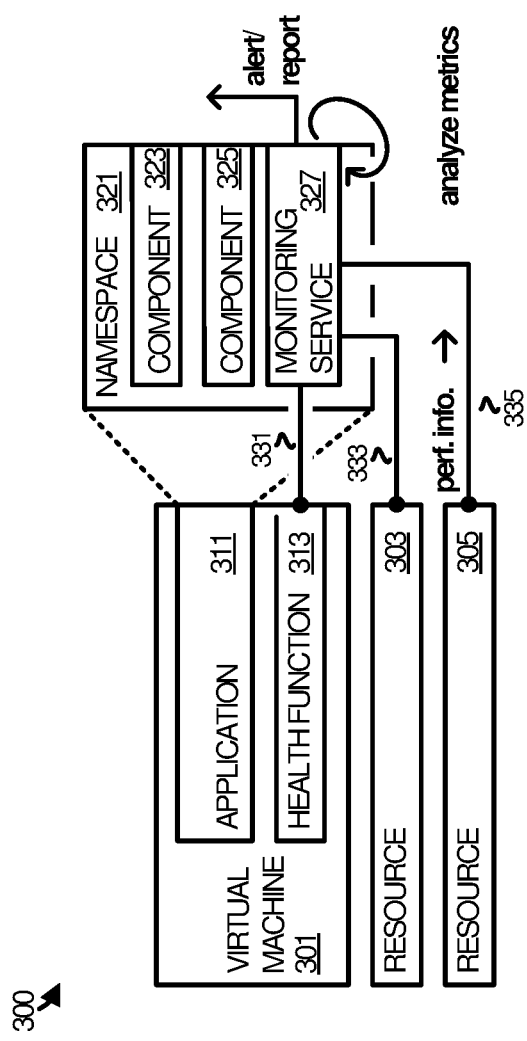
FIG. 3 illustrates an operational scenario in an implementation of enhanced service monitoring.

FIG. 3 illustrates operational scenario 300 in another implementation of enhanced service monitoring. Operational scenario 300 also relates to an online service that is hosted in a data center environment. Examples of the online service include, but are not limited to, email services, productivity services, collaboration services, gaming services, communication services (instant messaging, voice and video communications), media services (music, videos, television, and the like), e-commerce services, and cloud storage services, as well as any other type of online service.

The online service in operational scenario 300 is provided by a collection of computing elements, including (but not limited to) virtual machine 301, resource 303, and resource 305. Virtual machine 301 hosts application 311 and includes a health function 313. Other elements may be involved in operational scenario 300, such as physical computers and other data center equipment, but are not shown for purposes of clarity.

Application 311 is representative of any application that may be involved in the provisioning and delivery of the online service. Examples of application 311 include server applications, core application engines, database applications, and the like. Application 311 includes various components that execute in a namespace 321 allocated to application 311 by virtual machine 301. Representative components include component 323 and component 325.

Application 311 also includes monitoring service 327. Monitoring service 327 is representative of a component or collection of components that monitor a health of the online service, from within namespace 321. In other words, monitoring service 327, because it is a part of application 311, runs in the same namespace as other elements of application 311.

In operation, monitoring service 317 establishes probes into the various applications and resources that provide the online service. Probe 331 is representative of a probe established between monitoring service 327 and health function 313 in virtual machine; probe 333 is representative of a probe established between monitoring service 327 and resource 303; and probe 335 is representative of a probe established between monitoring service 327 and resource 305.

Monitoring service 327 collections performance information from the probes and analyzes the information to ascertain the operational status of a given element. Depending upon how healthy a given element is, monitoring service 327 may issue an alert to a higher-layer administration and management utility. Monitoring service 327 may also be triggered by the performance information to launch additional virtual machines, take elements out of service, or otherwise respond to a degraded state of an element. Monitoring service 327 may provide general reporting services in addition to specific alerts, so that long-term trends and other aspects of the online service can be examined.

Figure 4:
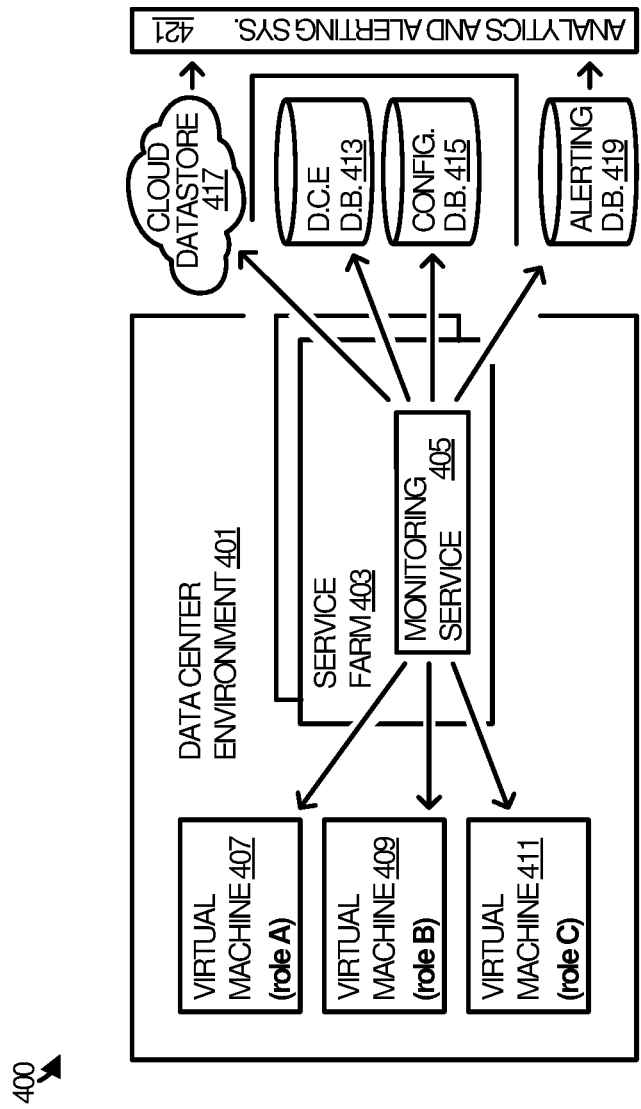
FIG. 4 illustrates an operational scenario in an implementation of enhanced service monitoring.

FIG. 4 illustrates operational scenario 400 in one more implementation of enhanced service monitoring. Operational scenario 400 involves a data center environment 401 in which a collaboration service is hosted. SharePoint® from Microsoft® is one example of a collaboration service that may be hosted in this manner.

Data center environment 401 may be an on-premises implementation, an off-premises (third-party) implementation, or a hybrid implementation. In addition to service farm 403, data center environment 401 includes various virtual machines that provide various roles in the service, represented by virtual machine 407 (role A), virtual machine 409 (role B) and virtual machine 411 (role C). Monitoring service 405 runs in service farm 403, in any one or more of the various applications executing in the farm.

Monitoring service 405 may be implemented using a number of classes illustrated in FIGS. 5-8. Monitoring service 405 is implemented using native SharePoint® code (or the code of any other suitable service). This has the technical effect of avoiding external technologies to monitor the health of a data center. A further technical effect is reduced load on the processor(s) and other resources in a data center as monitoring service 405 runs within the context of a service application, not as a separate process.

Monitoring service 405 provides the ability to consume service libraries directly to create a monitor that checks the health of resources within data center environment 401. The monitor consumes resource data pertinent to the health of the physical and virtual machines, databases, cloud end points, and other resources with a data center. Monitoring service 405 also provides the ability to schedule and trigger health checks on a timely and regular manner in real-time, as well as to alert and auto-heal there is problem with a health check. In some implementations the health checks may be authored using native, publicly exposed application programming interfaces of the service being monitored.

In some implementations, high-availability is provided for the health checks, such that when a health checker dies, another one may be spawned automatically during a scheduled run, with little or no human intervention. Health check data may be persisted into a cloud-based data store, represented by cloud data store 417 in FIG. 4. Health data may be provided to other destinations as well, such as a database in data center environment 401 (represented by data center environment database 413), a configuration database 415, or an alert database 419. All of those databases may in turn be accessed by an analytics and alerting system 421 that can perform trend analysis and alarm analysis on the data.

Including monitoring service 405 internal to service farm 403 and its applications allows health checks to be started simply, using scripts. Throttling which farms are enabled for various alerting profiles is also provided by monitoring service 405.

Figure 5:
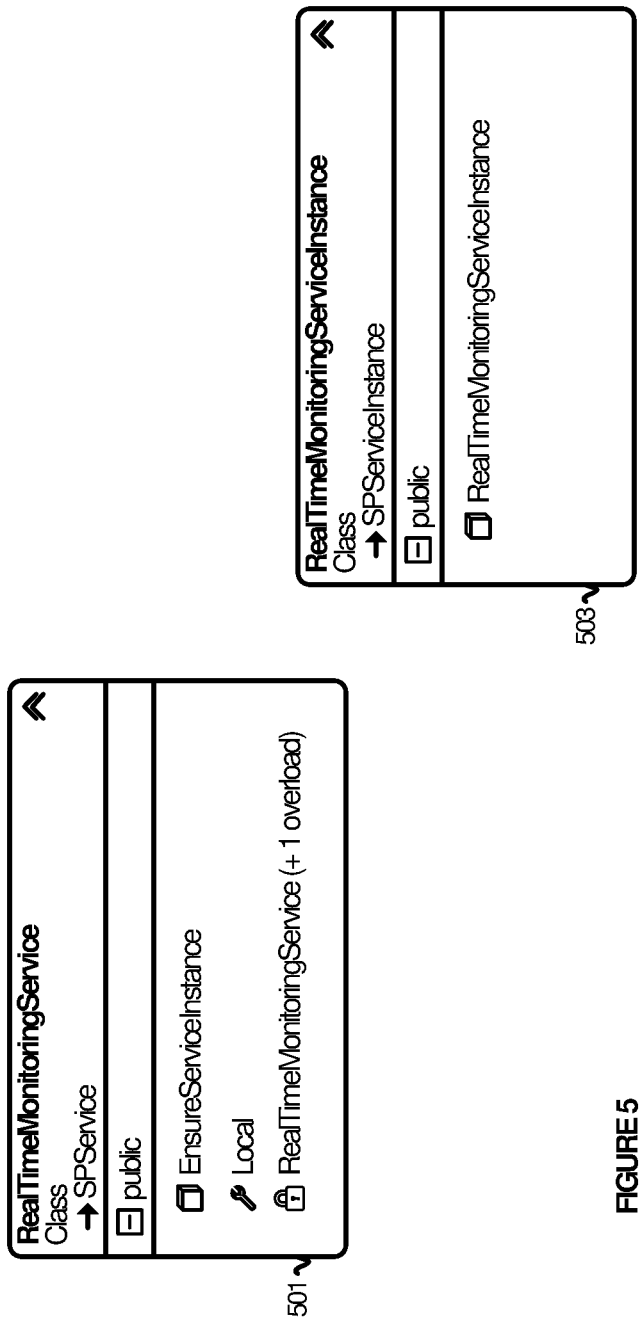
FIGS. 5-8 illustrate various classes for implementing enhanced service monitoring.

FIG. 5 illustrates a two classes that may be employed to implement monitoring service 405. Class 501 is the custom class for a real timer monitoring timer job that can be added to every service farm in a data center. Class 501 allows service personnel to control on which servers a monitoring job is run. Class 503 is an instance of class 501.

Monitoring service 405 may include a monitoring engine that runs in each instance of a service farm, such as service farm 403. The engine has direct access to a service application's object model and libraries without incurring additional overhead on the resources in the data center.

In one particular scenario, four monitoring jobs may be setup to run on any given farm within a data center. Each job processes different information from different probes.

A first job is scheduled to run every minute. Any monitoring task with a schedule of one minute will run under this job. A second job is scheduled to run every fifteen minutes. Any monitoring task with a schedule of fifteen minutes will run under this job. A third job is scheduled to run every thirty minutes. Any monitoring task with a schedule of thirty minutes will run under this job. Lastly, a fourth job is scheduled to run every hour. Any monitoring task with a schedule of one hour will run under this job.

All data generated by each monitor probe may be automatically uploaded to cloud data store 417 to enable real-time analytics and trending. In the meantime, the monitoring engine on each farm transmits a regular pulse to analytics and alerting system 421 to alert on the health degradation of a given farm. Processing logic and monitoring may thus be parallelized in such an arrangement.

Figure 6:
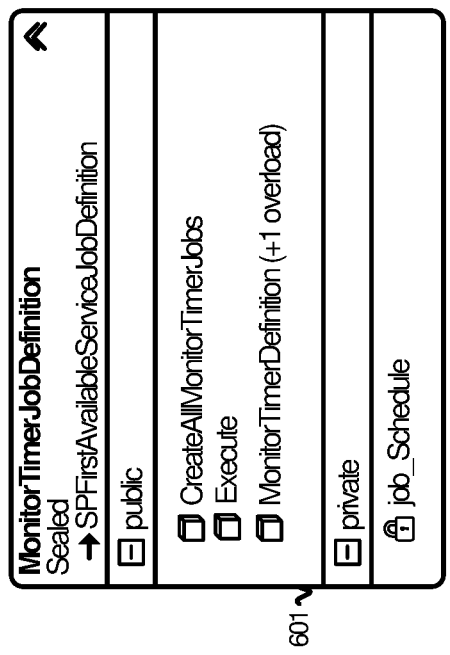

FIG. 6 illustrates class 601, which is representative of a job definition. The CreateAllMonitorTimerJobs method ensures that there is always a monitor job to process the monitor probes. The Execute method runs all the scheduled monitor probes based on their respective scheduling.

Figure 7:
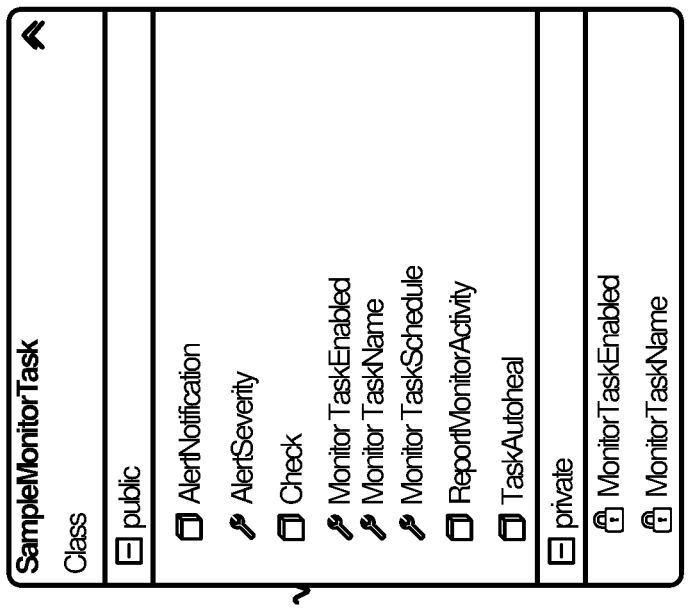
Figure 7:
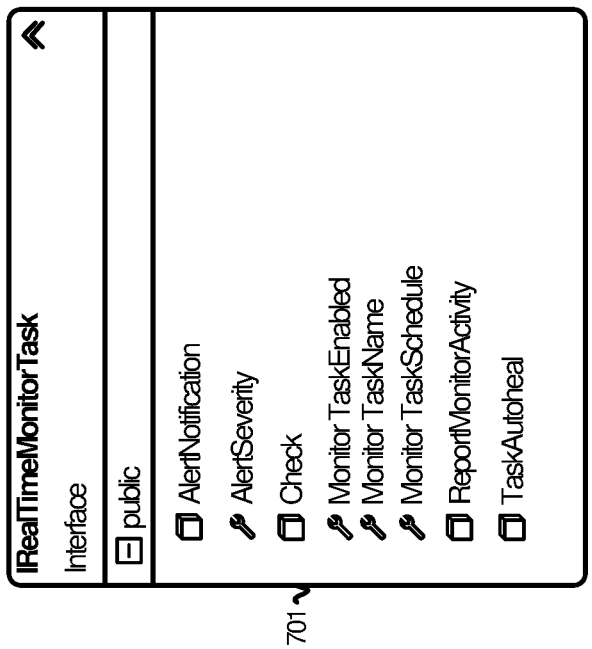

All monitor probes implement the IRealTimeMonitorTask interface, which is illustrated in FIG. 7 by interface 701. Class 703 is representative of a SampleMonitorTask. Every monitoring probe will derive from interface 701 and the task setting will be persisted in configuration database 415. Each monitor probe may have the ability to auto-heal issues found in the data center and to upload findings to the cloud. In addition, a monitor probe may be able to notify personal on duty when an issue arises that requires human intervention.

Figure 8:
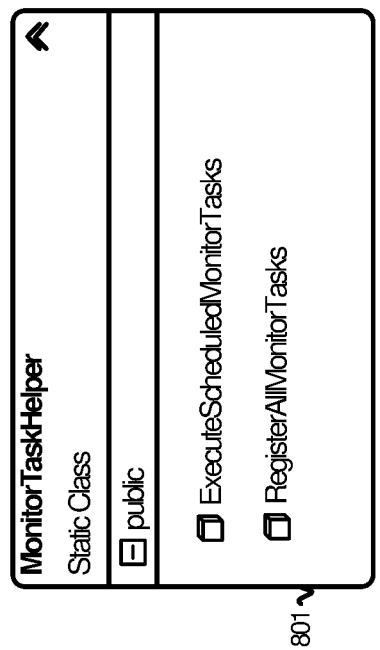

FIG. 8 illustrates a class 801 that is representative of a MonitorTaskHelper static class. Class 801 runs on all scheduled tasks and contains a set of utility functions that support the execution of code-based monitoring tasks.

The ExecuteScheduledMonitorTasks is a method that will run all scheduled tasks. The RegisterMonitorTask is a method that will persist a monitor task into configuration database 415.

Figure 9:
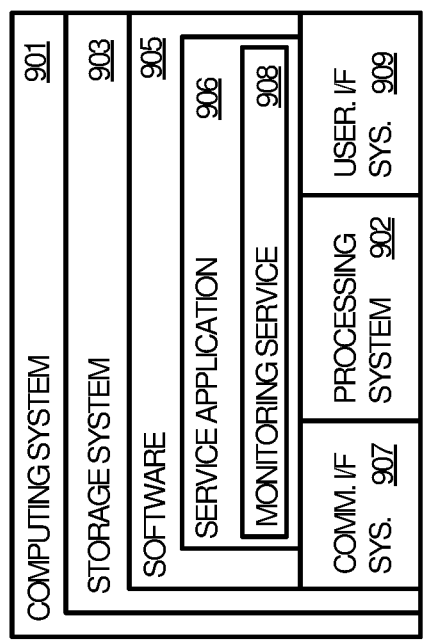
FIG. 9 illustrates a computing system suitable for implementing the enhanced service monitoring technology disclosed herein, including any of the elements, processes, and operational scenarios illustrated in the Figures and discussed below in the Technical Disclosure.

FIG. 9 illustrates computing system 901 that is representative of any system or collection of systems in which the various applications, services, scenarios, and processes disclosed herein may be implemented. Examples of computing system 901 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual machines, smart televisions, smart watches and other wearable devices, as well as any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes service application 906 and monitoring service 908, which is a part of service application 906, and which are representative of the service applications and monitoring services discussed with respect to the preceding FIGS. 1-8, including service application 107, monitoring service 111, application 311, monitoring service 327, service farm 403, and monitoring service 405.

When executed by processing system 902 to enhance service monitoring capabilities, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing enhanced service monitoring.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, hypervisor software, virtual machine software, or other application software, in addition to or that include service application 906 and monitoring service 908. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate enhanced service monitoring. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

Example 1. A method for monitoring a collaboration service comprising: hosting the collaboration service in a data center environment, wherein the data center environment comprises computing facilities and a service application executed on the computing facilities to provide at least a portion of the collaboration service; and, in the service application, monitoring the computing facilities and other resources running in the data center environment that provide at least another portion of the collaboration service.

Example 2. The method of Example 1 wherein the computing facilities comprises a virtual machine and wherein hosting the collaboration service comprises hosting the service application on the virtual machine.

Example 3. The method of Examples 1-2 wherein the other resources running in the data center comprise other virtual machines, databases, and a web server.

Example 4. The method of Examples 1-3 wherein monitoring the computing facilities and the other resources comprises, in the service application, hosting a monitoring service that runs natively in a namespace allocated to the service application on the virtual machine.

Example 5. The method of Examples 1-4 wherein monitoring the computing facilities and the other resources comprises the monitoring service querying the virtual machine for information generated by health checks performed by the virtual machine.

Example 6. The method of Examples 1-5 wherein the service application further comprises application components that also run natively in the namespace.

Example 7. The method of Examples 1-6 further comprising hosting an external monitoring service in the data center environment, external to the service application.

Example 8. The method of Examples 1-7 further comprising the monitoring service applying monitoring logic to determine when to communicate alerts in a performance of the collaboration service.

Example 9. The method of Examples 1-8 further comprising the monitoring service reporting on the performance of the collaboration service to a management utility external to the data center environment.

Example 10. A computing apparatus comprising: a storage system and program instructions stored on the storage system. The program instructions comprise an application installed on a virtual machine, wherein the application comprises: a plurality of components that provide at least a portion of a collaboration service in a data center environment; and a monitoring service that monitors the virtual machine and a plurality of other resources external to the virtual machine in the data center environment that provide at least other portions of the collaboration service. The computing apparatus further comprises a processing system operatively coupled with the stored system that executes the application in the context of the virtual machine.

Example 11. The computing apparatus of Example 10 wherein the plurality of other resources comprise other virtual machines, databases, and a web server.

Example 12. The computing apparatus of Examples 10-11 wherein the monitoring service runs natively in a namespace allocated to the service application on the virtual machine.

Example 13. The computing apparatus of Examples 10-12 wherein the monitoring service queries the virtual machine for information generated by health checks performed by the virtual machine.

Example 14. The computing apparatus of Examples 10-13 wherein the service application further comprises application components that also run natively in the namespace.

Example 15. The computing apparatus of Examples 10-14 wherein the monitoring service applies monitoring logic to determine when to communicate alerts in a performance of the collaboration service.

Example 16. The computing apparatus of Examples 10-15 wherein the monitoring service reports on the performance of the collaboration service to a management utility external to the data center environment.

Example 17. An apparatus comprising: one or more computer readable storage media; and a service application stored on the one or more computer readable storage media that comprises program instructions that, when executed by computing facilities in a data center environment, direct the computing facilities to at least: host at least a portion of a collaboration service; and from within the service application, monitor the computing facilities and other resources running in the data center environment that provide at least another portion of the collaboration service Example 18. The apparatus of Example 17 wherein the computing facilities comprise a virtual machine that runs the service application and wherein the other resources running in the data center comprise other virtual machines, databases, and a web server.

Example 19. The apparatus of Examples 17-18 wherein the program instructions include a plurality of components that provide the portion of the collaboration service and a monitoring service that monitors the computing facilities.

Example 20. The apparatus of Examples 17-19 wherein both the plurality of components and the monitor service run in a namespace allocated to the service application by the virtual machine.

Example 21. Means for hosting a collaboration service in a data center environment, wherein the data center environment comprises computing facilities and a service application executed on the computing facilities to provide at least a portion of the collaboration service. Means for, in the service application, monitoring the computing facilities and other resources running in the data center environment that provide at least another portion of the collaboration service.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A computing apparatus comprising:
a storage system;
program instructions stored on the storage system and comprising an application installed on a virtual machine, the application providing an online service, wherein the application comprises:
a plurality of components that execute in a namespace context allocated to the application by the virtual machine, wherein the plurality of components provide at least a portion of the online service and are coded using a programming code native to the online service; and
at least one further component coded using the programming code native to the online service that executes in the namespace context allocated to the application by the virtual machine, wherein the at least one further component provides a monitoring service that monitors at least performance of the plurality of components, and wherein the monitoring service reports monitored performance to a management entity; and
a processing system operatively coupled with the storage system that executes the application in the context of the virtual machine.

2. The computing apparatus of claim 1, wherein the monitoring service further monitors a plurality of other resources comprising at least one among other virtual machines, databases, and a web server.

3. The computing apparatus of claim 2, wherein the plurality of other resources are external to the virtual machine that provide at least other portions of the online service, and wherein the management entity is external to the virtual machine.

4. The computing apparatus of claim 1, wherein the programming code native to the online service comprises SharePoint code.

5. The computing apparatus of claim 1, wherein to monitor at least the performance of the plurality of components, the monitoring service queries the virtual machine for information generated by health checks performed by the virtual machine.

6. The computing apparatus of claim 1, wherein at least the portion of the online service and the monitoring service execute in the namespace context allocated to the application on the virtual machine.

7. The computing apparatus of claim 1, wherein the monitoring service applies monitoring logic to determine when to communicate alerts related to performance of the online service to the management entity.

8. A method for monitoring an online service comprising:
hosting the online service to serve user requests in a data center environment, wherein the data center environment comprises computing facilities and an application executed on the computing facilities to provide at least a portion of the online service, the application having a plurality of components, wherein the plurality of components are coded using a programming code native to the online service that execute in a namespace context allocated to the application by a virtual machine; and
in the application, executing at least one further component comprising a monitoring service in the namespace context allocated by the virtual machine, wherein the monitoring service is coded using the programming code native to the online service and is configured to monitor at least performance of operations of the plurality of components, wherein the monitoring service reports monitored performance to a management entity.

9. The method of claim 8, wherein the monitoring service further monitors a plurality of other resources external to the virtual machine that provide at least other portions of the online service.

10. The method of claim 9, wherein the plurality of other resources comprise at least one among other virtual machines, databases, and a web server.

11. The method of claim 8, wherein the computing facilities comprises the virtual machine and wherein hosting the online service comprises hosting the application on the virtual machine.

12. The method of 8, wherein the programming code native to the online service comprises SharePoint code.

13. The method of claim 8, wherein executing the monitoring service in the namespace context allocated to the application comprises executing the monitoring service in the namespace context allocated to the application on the virtual machine.

14. The method of claim 8, wherein to monitor at least the performance of the plurality of components, in the monitoring service, querying the virtual machine for information generated by health checks performed by the virtual machine.

15. The method of claim 8, further comprising the monitoring service applying monitoring logic to determine when to communicate alerts related to performance of the online service.

16. The method of claim 8, further comprising the monitoring service reporting on the performance of the online service to the management entity comprising a management utility external to the virtual machine.

17. An apparatus comprising:
one or more computer readable storage media; and
an application stored on the one or more computer readable storage media that comprises program instructions that, when executed by one or more processing systems, direct the one or more processing systems to at least:
from within a namespace context of the application allocated to the application by a virtual machine:
host at least a portion of an online service to serve user requests comprising a plurality of components of the application coded using a programming code native to the online service; and
host at least one further component of the application coded using the programming code native to the online service comprising a monitoring service that monitors at least performance of the plurality of components, wherein the monitoring service reports the monitored performance to a management entity external to the virtual machine.

18. The apparatus of claim 17, wherein the application comprises one or more additional components hosted in the namespace context allocated to the application in addition to the at least one further component, and wherein the one or more additional components are monitored by the at least one further component.

19. The apparatus of claim 17, wherein the monitoring service further monitors a plurality of other resources comprising at least one among other virtual machines, databases, and a web server external to the virtual machine that provide at least other portions of the online service.

20. The apparatus of claim 17, wherein the programming code native to the online service comprises SharePoint code.

* * * * *